United States Patent
Tan et al.

(10) Patent No.: US 10,845,965 B2
(45) Date of Patent: Nov. 24, 2020

(54) COLLABORATION MANAGEMENT SYSTEM

(71) Applicant: RAZER (ASIA-PACIFIC) PTE. LTD., Singapore (SG)

(72) Inventors: Min-Liang Tan, Singapore (SG); Ping He, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 320 days.

(21) Appl. No.: 15/694,179

(22) Filed: Sep. 1, 2017

(65) Prior Publication Data
US 2018/0012182 A1     Jan. 11, 2018

Related U.S. Application Data

(63) Continuation of application No. 12/959,931, filed on Dec. 3, 2010, now abandoned.

(51) Int. Cl.
*G06F 3/023*     (2006.01)
*G06F 3/033*     (2013.01)
(Continued)

(52) U.S. Cl.
CPC .............. *G06F 3/0484* (2013.01); *G06F 3/01* (2013.01); *G06F 3/023* (2013.01)

(58) Field of Classification Search
CPC .......... G06F 3/01; G06F 3/0484; G06F 3/023; A63F 13/02; A63F 13/12; A63F 13/22–245; A63F 13/40–428
See application file for complete search history.

(56) References Cited

U.S. PATENT DOCUMENTS 5,796,396 A    8/1998   Rich .............................. 715/741
6,965,368 B1   11/2005   Andrews ................. A63F 13/06
                                                              345/156
(Continued)

FOREIGN PATENT DOCUMENTS

CN           1647062 A      7/2005
TW        200941347 A    10/2009
(Continued)

OTHER PUBLICATIONS

First Office Action mailed by the Korean Intellectual Property Office dated Oct. 11, 2017 for corresponding Korean Patent Application No. 10-2013-7017248, 12 pages.
(Continued)

*Primary Examiner* — Yongjia Pan
*Assistant Examiner* — Linda Huynh
(74) *Attorney, Agent, or Firm* — Polsinelli PC (57) ABSTRACT

Known computer peripheral devices are typically interchangeable and can be used with different computers systems and platforms. Most computer operating systems are able to automatically configure the coupled computer peripheral device for use with the computer operating system without the need for installation of a specific driver. However, when these peripheral devices are detected by the computer system, a generic UI control configuration is often assigned to them and whatever customised settings previously configured by the user will be lost and replaced with a new set of unfamiliar settings. The present technology is a collaboration management system initiating a collaboration session for a plurality of computing systems having user-interfaces (UIs) coupled thereto. The collaboration management system discovers the device profiles corresponding to the UIs for extracting corresponding configuration specific to each of the UIs for configuring interactions (Continued)

between the UIs and an application operating during the collaboration session.

21 Claims, 3 Drawing Sheets

(51) Int. Cl.
  *G06F 3/048* (2013.01)
  *G06F 3/0484* (2013.01)
  *G06F 3/01* (2006.01)

(56) References Cited

U.S. PATENT DOCUMENTS

| | | | |
|---|---|---|---|
| 7,040,987 B2 | 5/2006 | Walker et al. | |
| 2003/0229900 A1 | 12/2003 | Reisman | G06F 17/30873 725/87 |
| 2004/0090416 A1 | 5/2004 | Biheller | A63F 13/06 345/156 |
| 2004/0119894 A1 | 6/2004 | Higgins | H04L 12/2805 348/734 |
| 2004/0212595 A1 | 10/2004 | Zhou | |
| 2005/0225530 A1* | 10/2005 | Evans | G06F 3/0238 345/156 |
| 2006/0080415 A1* | 4/2006 | Tu | H04L 67/1095 709/220 |
| 2007/0111796 A1* | 5/2007 | C. Giaimo | A63F 13/235 463/42 |
| 2007/0276795 A1 | 11/2007 | Poulsen | 707/2 |
| 2008/0170690 A1 | 7/2008 | Tysowski | H04L 51/14 380/270 |
| 2008/0177904 A1 | 7/2008 | Storey | G06F 9/4411 710/10 |
| 2008/0208908 A1 | 8/2008 | Kashyap et al. | 707/104.1 |
| 2009/0063179 A1 | 3/2009 | Huang | G06F 8/61 705/1.1 |
| 2009/0085871 A1 | 4/2009 | Bhogal et al. | 345/163 |
| 2009/0100129 A1 | 4/2009 | Vigil et al. | |
| 2009/0193086 A1 | 7/2009 | Lingafelt | H04L 12/581 709/206 |
| 2009/0241104 A1 | 9/2009 | Amiga et al. | |
| 2009/0312096 A1 | 12/2009 | Kane et al. | 463/31 |
| 2010/0005196 A1 | 1/2010 | Wolff-Petersen | 710/8 |
| 2010/0222000 A1 | 9/2010 | Sauer | G06F 9/4443 455/41.2 |
| 2011/0009192 A1* | 1/2011 | Aronzon | A63F 13/537 463/36 |
| 2011/0202689 A1* | 8/2011 | Koenig | G06F 9/4411 710/9 |
| 2012/0079080 A1* | 3/2012 | Pishevar | A63F 13/77 709/220 |

FOREIGN PATENT DOCUMENTS

| | | | | |
|---|---|---|---|---|
| WO | WO 2006107296 A1 | 10/2006 | | G06F 3/0238 |
| WO | WO 2009038537 A1 | 3/2009 | | G06F 3/0219 |
| WO | 2010/062617 A1 | 6/2010 | | |
| WO | WO 2010093831 A1 | 8/2010 | | |

OTHER PUBLICATIONS

The First Office Action dated Feb. 24, 2015; in Taiwanese patent application No. 100143757.
English translation of the First Office Action dated Feb. 24, 2015; in Taiwanese patent application No. 100143757.
English abstract for TW200941347; published on Oct. 1, 2009 and retrieved Apr. 14, 2015.
State Intellectual Property Office of P.R. China, First Office Action dated Feb. 4, 2015 (with English translation), for Chinese Patent Application No. 201180058304.8, 34 pages.
"International Search Report and Written Opinion dated Jul. 31, 2012," International Application No. PCT/SG2011/000427, 6 pages.
"International Preliminary Report on Patentability dated Jul. 4, 2013," International Application No. PCT/SG2011/000427, 4 pages.
NIST, NIST Definitoon of cloud computing v15, NIST, Editor. 2009, National Institute of Standards and Technology: Gaithersburg, MD (2009). Retrieved from http://www.nist.gov/itl/cloud/upload/cloud-def-v15.pdf.
Linux Information Project. (May 2005). Server definition. Retrieved from http://www.linfo.org/server.html (retrieved Mar. 11, 2013).

* cited by examiner

COLLABORATION MANAGEMENT SYSTEM

CROSS-REFERENCE TO RELATED APPLICATIONS

This application is a continuation of U.S. application Ser. No. 12/959,931, filed on Dec. 3, 2010, titled, "A COLLABORATION MANAGEMENT SYSTEM," which is hereby expressly incorporated herein by reference in its entirety.

FIELD OF INVENTION

The present invention relates generally to an online collaboration management system. In particular, the invention relates to a system and method for managing concurrent manipulation of data set by different computer peripherals utilising different setting configurations.

BACKGROUND

Known computer peripheral devices are typically interchangeable and can be used with different computers systems and platforms. Most computer operating systems are able to automatically configure the coupled computer peripheral device for use with the computer operating system without the need for installation of a specific driver. However, when these peripheral devices are detected by the computer system, a default UI control configuration is often assigned to them and whatever customised settings previously configured by the user will be lost and replaced with a new set of unfamiliar settings.

Similarly, in a video-conference setting, where multiple users from various terminals have access to a single set of data, a generic UI control configurations is often assigned to the various devices plugged into the terminals. These control configurations allow for manipulation of the single dataset, be it to rotate one or more objects generated from the dataset or to edit the dataset. However, due to the random assignment of control configurations to the various devices, users will have to test out these configurations in order to have a good grasp in using the device for manipulation of the dataset. An alternative would be to re-configure the control settings to one which the users are familiar with. These approaches pose much inconvenience especially if the users do not have the luxury of time to deal with these configuration settings.

In the gaming context, multiple users may access a gaming terminal from different access point to collaborate in a game play. Frequent gamers often have a preferred control configuration, for example, the keys to press for initiating a punch or to engage a weapon. Familiarity in these configurations would confer speed and accuracy in the game play. Other gamers have their preferred devices for example, a gaming mouse, keyboard, keypad or a joystick, for use in a particular game. When multiple users utilise different gaming devices in a single game play, their preferred configurations are lost and replaced with an unfamiliar set of control configurations. There is therefore an apparent need for a system and method whereby multiple users are able to concurrently interact with a single set of data from different terminals in their preferred manner using different devices.

SUMMARY

In accordance with a first aspect of the invention, there is disclosed a collaboration management system comprising a session module and a discovery module. The session module is for initiating a collaboration session between a plurality of computing systems and for managing interactions between the plurality of computing systems and an application. Each of the plurality of computing system has a user-interface (UI) in signal communication therewith. The discovery module is for cooperating with the plurality of computing systems to discover, for each of the plurality of computing systems, device data being descriptive of the UI and user interactions identifiable by the UI in signal communication therewith. The discovery module assigns one of a plurality of configuration data associated with at least one of the device data and identifier data providable by a user of the UI for each of the plurality of computing system. The configuration data assigned to each of the plurality of computing system defines interaction of the UI in signal communication therewith with the application during the collaboration session.

In accordance with a second aspect of the invention, there is disclosed a collaboration management method comprising initiating a collaboration session between a plurality of computing systems. The collaboration is initiated by a session module for managing interactions between the plurality of computing systems and an application. Each of the plurality of computing system has a user-interface (UI) in signal communication therewith. The collaboration management method further comprises discovering, by a discovery module for each of the plurality of computing systems, device data being descriptive of the UI and user interactions identifiable by the UI in signal communication therewith. The discovery module assigning one of a plurality of configuration data associated with at least one of the device data and identifier data providable by a user of the UI for each of the plurality of computing system. The configuration data assigned to each of the plurality of computing system defines interaction of the UI in signal communication therewith with the application during the collaborative session.

In accordance with a third aspect of the invention, there is disclosed a machine readable medium having stored therein a plurality of programming instructions, when executed, cause the machine to initiate a collaboration session between a plurality of computing systems. The collaboration is initiated by a session module for managing interactions between the plurality of computing systems and an application. Each of the plurality of computing system has a user-interface (UI) in signal communication therewith. The plurality of programming instructions, when executed, further cause the machine to discover, by a discovery module for each of the plurality of computing systems, device data being descriptive of the UI and user interactions identifiable by the UI in signal communication therewith. The discovery module assigning one of a plurality of configuration data associated with at least one of the device data and identifier data providable by a user of the UI for each of the plurality of computing system. The configuration data assigned to each of the plurality of computing system defines interaction of the UI in signal communication therewith with the application during the collaborative session.

DETAILED DESCRIPTION

Reference will now be made in detail to an exemplary embodiment of the present invention, examples of which are illustrated in the accompanying drawings. While the invention will be described in conjunction with the embodiment of the invention, it will be understood that they are not intended to limit the invention to the embodiment. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention For purposes of brevity and clarity, descriptions of embodiments of the present invention are limited hereinafter to the collaboration and management of a single data set by a plurality of users using different computer peripherals with different configuration settings. This however does not preclude embodiments of the invention where fundamental principals prevalent among the various embodiments of the invention such as operational, functional or performance characteristics are required.

Figure 1:
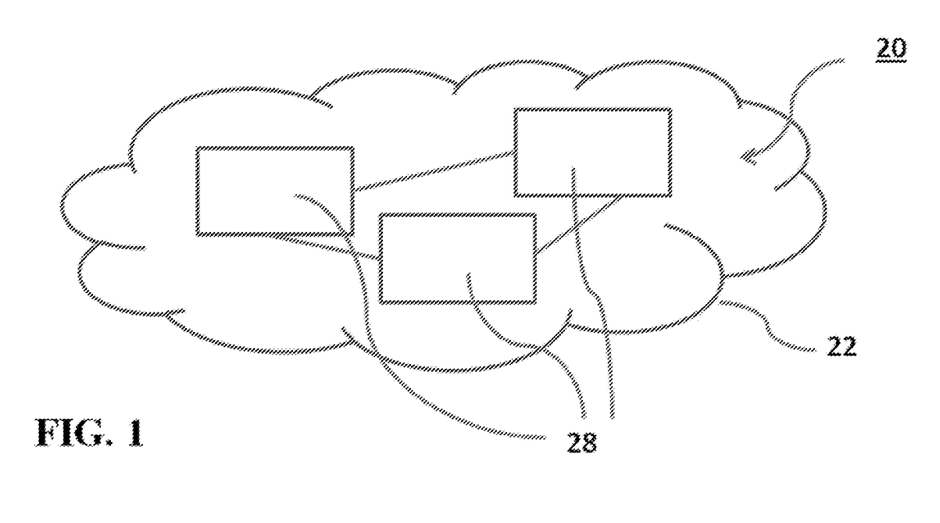
FIG. 1 shows a system diagram of a collaboration management system residing on a computing cloud according to an exemplary embodiment of the invention.
Figure 2:
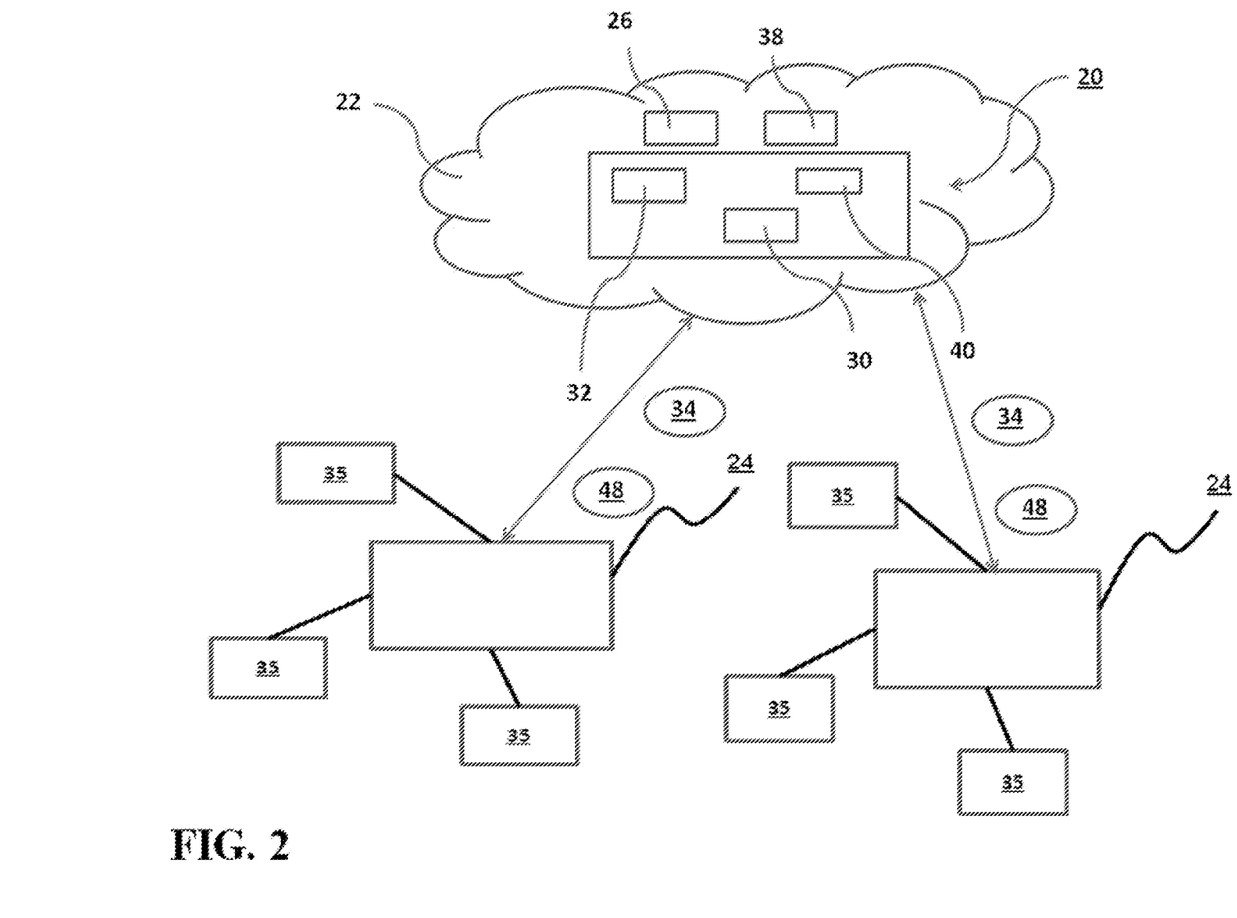
FIG. 2 shows a system diagram of the collaboration management system of FIG. 1 with user-interfaces in signal communication with computing systems coupled thereto.
Figure 4:
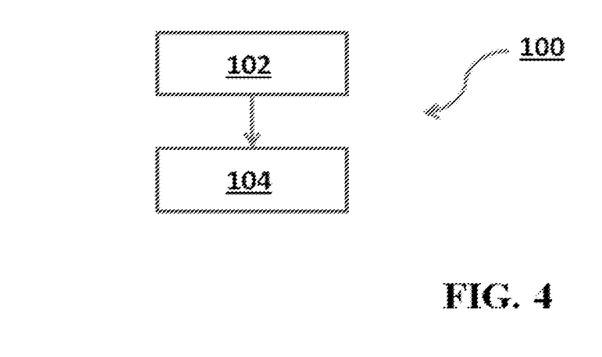
FIG. 4 shows a process flow diagram of a collaboration management method for implementation by the collaboration management system of FIG. 1.

An exemplary embodiment of the invention, a collaboration management system 20, is described hereinafter and shown in FIG. 1. The collaboration management system 20, residing on a computing cloud 22, is preferably for managing interactions between a plurality of computing systems 24 and an application 26, as shown in FIG. 2, in communication with a computing cloud 22. Further described is a collaboration management method 100, as shown in FIG. 4, applied by the collaboration management system 20 for its intended purpose.

Preferably, the computing cloud 22 comprises one or multiple server systems 28 inter-networked and configured to function as the collaboration management system 20. Communication pathway between the computing cloud 22 and the computing system 24 is preferably provided by a local area network (LAN), a wide area network (WAN), the Internet, cellular networks, data networks, dedicated networks or a combination of any thereof.

Figure 3:
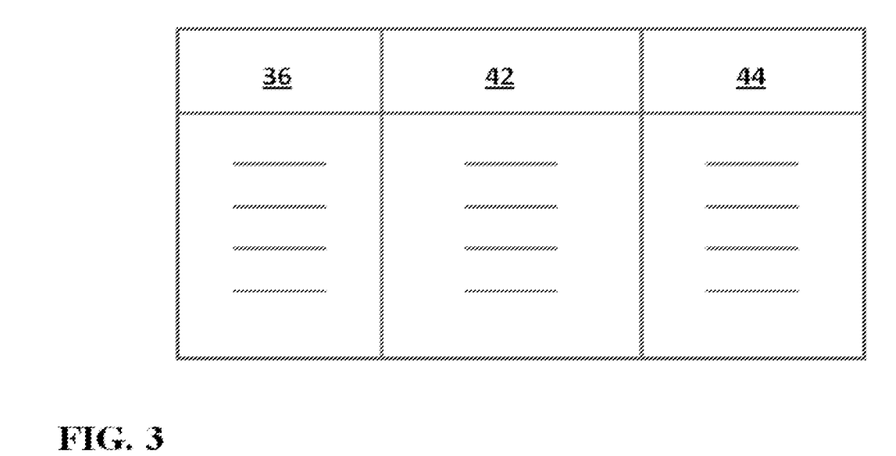
FIG. 3 shows a storage module of the collaboration management system of FIG. 2.

FIG. 2 shows a system diagram of the collaboration management system of FIG. 1 with user-interfaces in signal communication with computing systems coupled thereto. The collaboration management system 20 comprises a session module 30 for initiating a collaboration session between a plurality of computing systems 24 and an application 26, a discovery module 32 to discover, for each of the plurality of computer systems 24, device data 34 of a user interface 35 (UI 35) in signal communication therewith and to thereby assign one of the plurality of configuration data 36, as shown in FIG. 3, stored on the collaboration management system 20 to the computing system 24 for defining interactions between each of computing systems 24 and the UI 35 in signal communication therewith. Each of the plurality of computing systems 24 in signal communication with the device data 34 is able to download one of the configuration data 36 unique to their devices for manipulation of a single dataset 38 managed by the application 26.

FIG. 3 shows a storage module of the collaboration management system of FIG. 2. The collaboration management system 20 further comprises a storage module 40 for storing the plurality of configuration data 36. Each of the plurality of configuration data 36 has at least one of a device profile 42 and a user identifier 44 associated therewith for use in identifying association between one of the plurality of the configuration data 36 with at least one of the device data 34 and an identifier data 48 receivable from each of the plurality of the computing system 24.

The collaboration management method 100 comprises a step 102 of initiating a collaboration session by the session module 30 between the plurality of computing systems 24 and the application 26. The collaboration management method 100 further comprises a step 104 of discovering, by the discovery module 32 for each of the plurality of computer systems 24, device data 34 in signal communication therewith and thereby assigning the corresponding configuration data 36 stored in the collaboration management system 20 to the computing system 24.

When a plurality of computing system 24 is in network communication with the computing cloud 22 and logged onto the collaboration management system 20, the session module 30 performs the step 102 and manages interactions between the plurality of computing systems 24 and the application 26. The application 26 can be one of a gaming application, where a plurality of gamers are concurrently involved in a gaming session or any other software application whereby a single dataset 38 is presented for access or concurrent manipulation by each of the plurality of users at each of the plurality of computer systems 24 in network communication with the collaboration management system 20. Device type of the UI 35 coupled to one of the computing systems, wired or wirelessly, may differ from the device type of the UI 35 coupled to another of the computing systems 24. Therefore, device-specific configuration settings are required for different devices to effect similar control signals to manipulate the single dataset 38 or virtual objects generated therefrom. The device data 34 is descriptive of user interactions identifiable by the UI 35. For example, if the UI 35 is a 3D mouse, the user interactions identifiable by the 3D mouse would include free-space movement or position, scrolling actions and actuation of specific buttons existing on the 3D mouse. However, if the UI 35 is a multi-touch interface, the user interactions identifiable by the multi-touch interface would include locations of one or more points and gestures generatable by the one or more touch points on the multi-touch interface. Therefore, the user interactions identifiable and hence the device data when the UI 35 is a 3D mouse differs from when the UI 35 is a multi-touch interface.

Preferably, the UI 35 in signal communication with each of the plurality of computing systems 24 is a computer peripheral. Alternatively, the UI 35 is at least one of device for at least one of input sensing and providing sensory output. Examples of the UI 35 include but are not limited to gaming console, joystick, computer mouse, keyboard and speakers. Alternatively, the UI 35 includes devices which are connectable for use with or forms part of the computer system 24, for example, the touch screen interface of a cell phone and smart phones.

Preferably, the step 104 occurs in response to or in preparation for the initiation of the collaboration session. The computing system 24 generates the device data 34 for the UI 35 when the UI 35 is recognised thereby. During the step 104, the user may be required to manually log-onto the collaboration management system 20 by providing the identifier data 48 for extraction of device profile 42 associated therewith. The discovery module 32 then assigns one of the plurality of configuration data 36 associated with at least one of the device data 34 and the identifier data 48 to each of the plurality of computing system 24. The configuration data 36 assigned to each of the plurality of computing systems 24 defines interaction of the UI 35 in signal communication therewith with the application 26 during the collaboration session.

At least one of the plurality of configuration data 36 associates control signals generatable by the UI 35 of one of the plurality of the computing systems 24 with one of the plurality of instructions executable by the application 26. Consequently, different types of the UIs 35 in signal communication with the plurality of computing systems 24 will consequently be able to provide control signals to the application 26 for execution of at least one of the plurality of substantially identical instructions using different configuration data 36. For example, the generation of control signals to rotate an object can be effected by either a rotational gesture on the multi-touch screen device coupled to one of the computing systems 24 and rotational movement on a joystick connected to another of the computing systems 24. Preferably, the configuration data 36 are editable or replaceable with another of the plurality of configuration data 36 during the collaboration session.

Preferably, the application 26 is substantially concurrent and operable by the plurality of computing systems 24 via the UI 35 of each for manipulating a single dataset 38. Manipulation of a single dataset 38 comprises at least one of editing, deleting from and adding to the single dataset 38. Preferably, the single dataset 38 is able to generate at least one object to be provided to the plurality of computing systems 24 for display by the UI 35 with display capability. The configuration data 36 is further able to determine the display preference of at least one object by the UI 35 with display capability of each of the corresponding computing systems 24.

When a plurality of users log onto the collaboration management system 20, the collaboration management system 20 detects the UI 35 in signal communication with each of the plurality of the computing systems 24 and thereafter assigns one of the configuration data 36 in association with at least one of the device data 34 and the identifier data 48 to the respective computing system 24. Assignment of the configuration data 36 can either be automated upon detection of UI 35 by the collaboration management system 20 or be manually controlled by the user. Each user further has the option to edit or replace the configuration data 36 assigned during the collaboration session. Each configuration data 36 is associated with at least one of a plurality of device profile 42. At least one of a plurality of device profile 42 is associated with an user identifier 44 such that a single user may have more than one device profile 42 associated with the configuration data 36 stored in the storage module 40 in the collaboration management system 20.

The collaboration management system 20 allows each user to concurrently manipulate a single dataset 38, or virtual objects generated from the single dataset, with their preferred device configuration settings. For new users of the collaboration management system 20, the new user is able to download default configuration settings, specifically one of the configuration data 36, substantially matching with the device data 34 provided to the computing system 24, from the collaboration management system 20.

The collaboration management system 20 can also function with a single computing system 24 where a plurality of users are able to manipulate a single dataset 38 using different UIs 35. The collaboration management system 20 enables the users to download their preferred configuration settings to the computing system 20 wherewith their UIs 35 are coupled. This way, even a single terminal is able to translate the different configuration settings to execute similar control signals to manipulate a single dataset 38.

In an example of use of the collaboration management system 20, a first user couples a 3D mouse to a first one of the computing systems 24 while a second user couples a 2D mouse with a second one of the computing systems 24 during a collaboration session for viewing a 3D object generated by the application 26 from the dataset 38. The default configurations for rotating the 3D object about its x-axis may be rotating the 3D mouse about its x-axis or displacing the 2D mouse along its y-axis while depressing a left button thereon. These may be interactions unfamiliar or counter-intuitive to the first and second users. By providing the user name as the identifier data 48 of each of the first and second users and the device data 34 descriptive of each of the 3D mouse and the 2D mouse during log-on to the collaboration management system 20, the configuration data 36 corresponding to the first user for the 3D mouse and for the second user for the 2D mouse can be provided to respectively the first one and the second one of the computing systems 24. The configuration data 36 contains the preferred configurations of the first user and the second user. When the corresponding configuration data 36 is applied to each of the first one and second one of the computing systems 24, rotating the 3D mouse about its z-axis now rotates the 3D object about its x-axis while displacing the 2D mouse along its y-axis without depressing its left button will rotate the 3D object about its x-axis. The configuration data 36 for any of the 2D mouse and the 3D mouse could include one or more of button configuration, scroll-wheel and mouse displacement sensitivity and lighting or haptic feedback response to the gaming mouse. The availability of the configuration data 36 allows the user to quickly configure the gaming mouse, or other UIs 35, when used on a different computer.

The collaboration management method 100 preferably exists on the collaboration management system 20 as a plurality of instructions stored on a machine readable medium constituting part of the computing cloud 22. It is preferred that the instructions, when executed, cause the profile management system to perform the step of the collaboration management method 100.

In a forgoing manner, a collaboration management system and a collaboration management method are described according to exemplary embodiments of the invention. Although only a number of embodiments of the invention are disclosed in this document, it will be apparent to one skilled in the art in view of this disclosure that numerous changes and/or modifications can be made to the disclosed embodiments without departing from the scope and spirit of the invention.

What is claimed is:

1. A collaboration management system residing on a computing cloud, the collaboration management system comprising:
    a processor;

a storage module storing a first configuration data corresponding to a first predetermined configuration setting for a first computer peripheral device, a second configuration data corresponding to a second predetermined configuration setting for a second computer peripheral device, and a further predetermined configuration setting for a further computer peripheral device, wherein the first configuration data is associated with a first user identifier and a first device data, wherein the second configuration data is associated with a second user identifier and a second device data, and wherein the further configuration data is associated with a further user identifier and a further device data;

a machine readable medium storing a plurality of machine executable instructions, the instructions, when executed are effective to:

initiate a collaboration session between a first computer operating system associated with a first user identifier for a first user and a second computer operating system associated with a second user identifier for a second user, where both of the first computer operating system and the second computer operating system are engaged with an application; and thereafter:

discover from the first computer operating system the first device data descriptive of the first computer peripheral device that is in signal communication with the first computer operating system and descriptive of user interactions identifiable by the first computer peripheral device;

discover from the second computer operating system the second device data descriptive of the second computer peripheral device that is in signal communication with the second computer operating system and descriptive of user interactions identifiable by the second computer peripheral device;

assign, from the storage module, the first configuration data to the first computer operating system based on the first user identifier and the first device data discovered;

wherein the first configuration data defines predetermined user interactions that are identifiable by the first computer peripheral device to generate, by the first computer peripheral device, control signals for manipulating a single dataset corresponding to the application;

assign, from the storage module, the second configuration data to the second computer operating system based on the second user identifier and the second device data discovered;

wherein the second configuration data defines predetermined user interactions that are identifiable by the second computer peripheral device to generate, by the second computer peripheral device, control signals for manipulating the single dataset corresponding to the application;

wherein each of the first configuration data assigned to the first computer peripheral device and the second configuration data assigned to the second computer peripheral device respectively configures the first computer peripheral device and the second computer peripheral device for manipulating the single dataset corresponding to the application; and the application being concurrently operable by a further computer operating system via the further computer peripheral device in signal communication with the further computer operating system for manipulating the single dataset;

wherein the further user identifier for a further user and the further device data is discoverable from the further computer operating system by the collaboration management system;

wherein the further device data is descriptive of the further computer peripheral device that is in signal communication with the further computer operating system and descriptive of user interactions identifiable by the further computer peripheral device;

wherein a further configuration data is assignable, from the storage module, to the further computer operating system based on the further user identifier and the further device data discovered.

2. The collaboration management system as in claim 1, wherein manipulating the single dataset comprises at least one of editing, deleting from and adding to the single dataset.

3. The collaboration management system as in claim 1, the single dataset for generating at least one object being provided to each of the first computer operating system, the second computer operating system and the further computer operating system for display by the first computer peripheral device, the second computer peripheral device and the further computer peripheral device of each thereof.

4. The collaboration management system as in claim 3, the first configuration data, the second configuration data and the further configuration data assigned respectively to the first computer operating system, the second computer operating system and the further computer operating system further determining a display preference of the at least one object by the first computer peripheral device, the second computer peripheral device and the further computer peripheral device of each thereof.

5. The collaboration management system as in claim 1, wherein each of the first configuration data, the second configuration data and the further configuration data having at least one of a configuration profile and a user profile associated therewith for use in identifying an association between at least one of the first configuration data, the second configuration data and the further configuration data with at least one of the first device data, the second device data, the further device data, the first user identifier, the second user identifier and the further user identifier.

6. The collaboration management system as in claim 1, the first configuration data, the second configuration data and the further configuration data assigned respectively to the first computer operating system, the second computer operating system and the further computer operating system being at least one of editable and replaceable with another configuration data during the collaboration session.

7. The collaboration management system as in claim 1, at least one of the first configuration data, the second configuration data and the further configuration data being downloadable by at least one of the first user, the second user and the further user respectively to at least one of the first computer operating system, the second computer operating system and the further computer operating system.

8. A collaboration management method comprising:

storing, in a storage module, a first configuration data corresponding to a first predetermined configuration setting for a first computer peripheral device, a second configuration data corresponding to a second predetermined configuration setting for a second computer peripheral device, and a further predetermined configuration setting for a further computer peripheral device, wherein the first configuration data is associated with a first user identifier and a first device data, wherein the second configuration data is associated with a second user identifier and a second device data, and wherein the further configuration data is associated with a further user identifier and a further device data;

initiating, by a processor, a collaboration session between a first computer operating system associated with a first user identifier for a first user and a second computer operating system associated with a second user identifier for a second user, where both of the first computer operating system and the second computer operating system are engaged with an application; and thereafter;

discovering from the first computer operating system the first device data descriptive of the first computer peripheral device that is in signal communication with the first computer operating system and descriptive of user interactions identifiable by the first computer peripheral device;

discovering from the second computer operating system the second device data descriptive of the second computer peripheral device that is in signal communication with the second computer operating system and descriptive of user interactions identifiable by the second computer peripheral device;

assigning, from the storage module, the first configuration data to the first computer operating system based on the first user identifier and the first device data discovered;

wherein the first configuration data defines predetermined user interactions that are identifiable by the first computer peripheral device to generate, by the first computer peripheral device, control signals for manipulating a single dataset corresponding to the application; and assigning, from the storage module, the second configuration data to the second computer operating system based on the second user identifier and the second device data discovered;

wherein the second configuration data defines predetermined user interactions that are identifiable by the second computer peripheral device to generate, by the second computer peripheral device, control signals for manipulating the single dataset corresponding to the application; and wherein each of the first configuration data assigned to the first computer peripheral device and the second configuration data assigned to the second computer peripheral device respectively configures the first computer peripheral device and the second computer peripheral device for manipulating the single dataset corresponding to the application; and the application being concurrently operable by a further computer operating system via the further computer peripheral device in signal communication with the further computer operating system for manipulating the single dataset;

wherein the further user identifier for a further user and the further device data is discoverable from the further computer operating system by the collaboration management system;

wherein the further device data is descriptive of the further computer peripheral device that is in signal communication with the further computer operating system and descriptive of user interactions identifiable by the further computer peripheral device;

wherein a further configuration data is assignable, from the storage module, to the further computer operating system based on the further user identifier and the further device data discovered.

9. The collaboration management method as in claim 8, wherein manipulating the single dataset comprises at least one of editing, deleting from and adding to the single dataset.

10. The collaboration management method as in claim 8, the single dataset for generating at least one object being provided to each of the first computer operating system, the second computer operating system and the further computer operating system for display by the first computer peripheral device, the second computer peripheral device and the further computer peripheral device of each thereof.

11. The collaboration management method as in claim 10, the first configuration data, the second configuration data and the further configuration data assigned respectively to the first computer operating system, the second computer operating system and the further computer operating system further determining a display preference of the at least one object by the first computer peripheral device, the second computer peripheral device and the further computer peripheral device of each thereof.

12. The collaboration management method as in claim 8, each of the first configuration data, the second configuration data and the further configuration data having at least one of a configuration profile and a user profile associated therewith for use in identifying an association between at least one of the first configuration data, the second configuration data and the further configuration data with at least one of the first device data, the second device data, the further device data, the first user identifier, the second user identifier and the further user identifier.

13. The collaboration management method as in claim 8, the first configuration data, the second configuration data and the further configuration data assigned respectively to the first computer operating system, the second computer operating system and the further computer operating system being at least one of editable and replaceable with another configuration data during the collaboration session.

14. The collaboration management method as in claim 8, further comprising enabling at least one of the first user, the second user and the further user to download at least one of the first configuration data, the second configuration data and the further configuration data respectively to at least one of the first computer operating system, the second computer operating system and the further computer operating system.

15. A non-transitory machine readable medium having stored therein a plurality of programming instructions, which when executed by a processor, cause a machine to:
store, in a storage module, a first configuration data corresponding to a first predetermined configuration setting for a first computer peripheral device, a second configuration data corresponding to a second predetermined configuration setting for a second computer peripheral device, and a further predetermined configuration setting for a further computer peripheral device, wherein the first configuration data is associated with a first user identifier and a first device data, wherein the second configuration data is associated with a second user identifier and a second device data, and wherein the further configuration data is associated with a further user identifier and a further device data;

initiate, by a processor, a collaboration session between a first computer operating system associated with a first user identifier for a first user and a second computer operating system associated with a second user identifier for a second user, where both of the first computer operating system and the second computer operating system are engaged with an application; and thereafter:

discover from the first computer operating system the first device data descriptive of the first computer peripheral device that is in signal communication with the first computer operating system and descriptive of user interactions identifiable by the first computer peripheral device;

discover from the second computer operating system the second device data descriptive of the second computer peripheral device that is in signal communication with the second computer operating system and descriptive of user interactions identifiable by the second computer peripheral device;

assign, from the storage module, the first configuration data to the first computer operating system based on the first user identifier and the first device data discovered;

wherein the first configuration data defines predetermined user interactions that are identifiable by the first computer peripheral device to generate, by the first computer peripheral device, control signals for manipulating a single dataset corresponding to the application;

assign, from the storage module, the second configuration data to the second computer operating system based on the second user identifier and the second device data discovered;

wherein the second configuration data defines predetermined user interactions that are identifiable by the second computer peripheral device to generate, by the second computer peripheral device, control signals for manipulating the single dataset corresponding to the application;

wherein each of the first configuration data assigned to the first computer peripheral device and the second configuration data assigned to the second computer peripheral device respectively configures the first computer peripheral device and the second computer peripheral device for manipulating the single dataset corresponding to the application; and the application being concurrently operable by a further computer operating system via the further computer peripheral device in signal communication with the further computer operating system for manipulating the single dataset;

wherein the further user identifier for a further user and the further device data is discoverable from the further computer operating system by the collaboration management system;

wherein the further device data is descriptive of the further computer peripheral device that is in signal communication with the further computer operating system and descriptive of user interactions identifiable by the further computer peripheral device;

wherein a further configuration data is assignable, from the storage module, to the further computer operating system based on the further user identifier and the further device data discovered.

16. The non-transitory machine readable medium as in claim 15, wherein manipulating the single dataset comprises at least one of editing, deleting from and adding to the single dataset.

17. The non-transitory machine readable medium as in claim 15, the single dataset for generating at least one object being provided to each of the first computer operating system, the second computer operating system and the further computer operating system for display by the first computer peripheral device, the second computer peripheral device and the further computer peripheral device of each thereof.

18. The non-transitory machine readable medium as in claim 17, the first configuration data, the second configuration data and the further configuration data assigned respectively to the first computer operating system, the second computer operating system and the further computer operating system further determining a display preference of the at least one object by the first computer peripheral device, the second computer peripheral device and the further computer peripheral device of each thereof.

19. The non-transitory machine readable medium as in claim 15, each of the first configuration data, the second configuration data and the further configuration data having at least one of a configuration profile and a user profile associated therewith for use in identifying an association between at least one of the first configuration data, the second configuration data and the further configuration data with at least one of the first device data, the second device data, the further device data, the first user identifier, the second user identifier and the further user identifier.

20. The non-transitory machine readable medium as in claim 15, the first configuration data, the second configuration data and the further configuration data assigned respectively to the first computer operating system, the second computer operating system and the further computer operating system being at least one of editable and replaceable with another configuration data during the collaboration session.

21. The non-transitory machine readable medium as in claim 15, at least one of the first configuration data, the second configuration data and the further configuration data being downloadable by at least one of the first user, the second user and the further user respectively to at least one of the first computer operating system, the second computer operating system and the further computer operating system.

* * * * *